(12) United States Patent
Haswell et al.

(10) Patent No.: US 8,455,556 B2
(45) Date of Patent: Jun. 4, 2013

(54) FISCHER-TROPSCH CATALYST

(75) Inventors: Ralph Haswell, Amsterdam (NL); Carolus Matthias Anna Maria Mesters, Amsterdam (NL); Heiko Oosterbeek, Amsterdam (NL); Thomas Joris Remans, Amsterdam (NL); Marinus Johannes Reynhout, Amsterdam (NL)

(73) Assignee: Shell Oil Company, Houston, TX (US)

( * ) Notice: Subject to any disclaimer, the term of this patent is extended or adjusted under 35 U.S.C. 154(b) by 129 days.

(21) Appl. No.: 12/373,464

(22) PCT Filed: Jul. 12, 2007

(86) PCT No.: PCT/EP2007/057203
§ 371 (c)(1),
(2), (4) Date: Jan. 12, 2009

(87) PCT Pub. No.: WO2008/006885
PCT Pub. Date: Jan. 17, 2008

(65) Prior Publication Data
US 2010/0004346 A1      Jan. 7, 2010

(30) Foreign Application Priority Data
Jul. 14, 2006  (EP) .................................. 06117194

(51) Int. Cl.
*C07C 27/00* (2006.01)
*C07C 27/06* (2006.01)
(52) U.S. Cl.
USPC .......... 518/719; 518/721; 518/715; 502/325; 502/338

(58) Field of Classification Search
USPC ................. 518/715, 719–721; 502/325–326, 502/161, 338
See application file for complete search history.

(56) References Cited

U.S. PATENT DOCUMENTS

| 2,533,071 A | 12/1950 | Vesterdial et al. ........ 260/449.06 |
| 4,532,229 A | 7/1985 | Fiato et al. .................... 502/330 |
| 2004/0126296 A1* | 7/2004 | Motal et al. ............... 423/244.01 |

FOREIGN PATENT DOCUMENTS

| GB | 668140 | 3/1952 |
| WO | WO9306041 | 4/1993 |
| WO | WO02087743 | 11/2002 |

OTHER PUBLICATIONS

Bukur et al., Pretreatment effect studies with a precipitated iron Fischer-Tropsch catalyst, 1995, Applied Catalysis A:General, 126, 85-113.*

(Continued)

*Primary Examiner* — Kaj K Olsen
*Assistant Examiner* — Pritesh Darji

(57) ABSTRACT

A process for the preparation of a packed bed comprising an iron enriched cobalt catalyst for use in a Fischer-Tropsch reaction, the process comprising the steps of: (a) providing a packed bed with one or more catalyst particles comprising metallic cobalt; (b) contacting a part of the catalyst particle(s) in the packed bed with an iron containing compound. The process is preferably conducted in situ which conveniently results in an iron containing cobalt catalyst with a higher $C_{5+}$ selectivity. In certain preferred embodiments the concentration of iron increases towards the surface of the resulting catalyst particles whereas the cobalt concentration is constant which further increases the selectivity of the catalyst to producing $C_{5+}$ hydrocarbons.

8 Claims, 1 Drawing Sheet

OTHER PUBLICATIONS

Jong et al., Deposition of iron from iron-carbonyl onto a working Co-based Fischer Tropsch catalyst: The serendipitious discovery of a direct probe for diffusion limitation, 1998, Elsevier Science, vol. 119, pp. 119-124.*

Coville, NJ, et al: "Fe :Co/Ti02 Bimetallic Catalysts for the Fischer-Tropsch Reaction. I. Characterization and Reactor Studies", Applied Catalysis A: General, Elsevier Science, Amsterdam, NL, vol. 153, No. 1-2 , 1997.

Kuhre, CJ, et al : "Partial Oxidation rows Stronger in US", Oil & Gas Journal, Sep. 6, 1971, pp. 86-90.

* cited by examiner

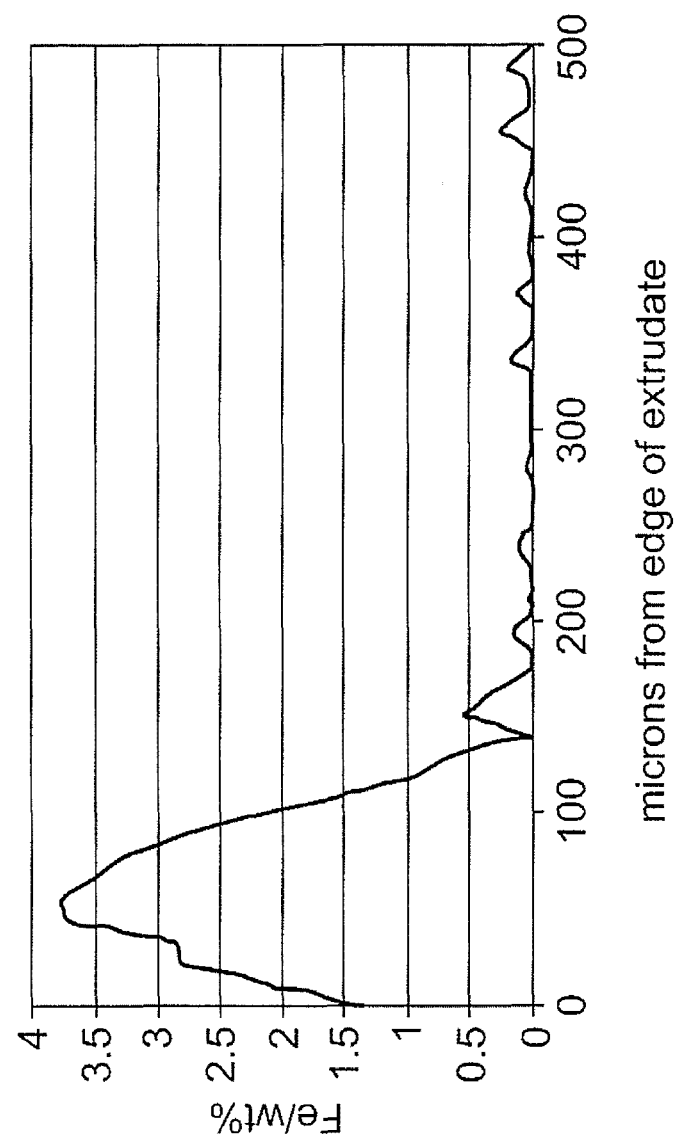

FISCHER-TROPSCH CATALYST

PRIORTY CLAIM

The present application claims priority to European Patent Application 06117194.8 filed 14 Jul. 2006.

FIELD OF THE INVENTION

The invention relates to catalysts containing cobalt and iron for use in a Fischer-Tropsch reactor and in particular a process for its manufacture.

BACKGROUND OF THE INVENTION

Many documents are known describing methods and processes for the catalytic conversion of (gaseous) hydrocarbonaceous feedstocks, especially methane, natural gas and/or associated gas, into liquid products, especially methanol and liquid hydrocarbons, particularly paraffinic hydrocarbons.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into one or more reactors where it is converted in one or more steps over a suitable catalyst at elevated temperature and pressure into paraffinic compounds ranging from methane to high molecular weight modules comprising up to 200 carbon atoms, or, under particular circumstances, even more. Preferably the amount of $C_{5+}$ hydrocarbons produced is maximised and the amount of methane and carbon dioxide is minimised.

One object of the present invention is to increase the proportion of $C_{5+}$ hydrocarbons and/or to reduce the proportion of carbon dioxide and methane produced.

In the Fischer-Tropsch synthesis, a three phase system of gas, liquid and solid is provided—the solid supported catalyst, the reactants and a diluent, if present, and the products. Such three phase systems may be operated, for example, in a packed-bed reactor or in a slurry-bubble reactor.

A slurry-bubble reactor may comprise a continuous phase of liquid with the solid catalyst suspended therein and gaseous reactants flowing as bubbles through the liquid. The relatively fine powder that can suitably be used in a slurry-bubble or fluidised bed reactor generally consists of micron-sized particles.

A packed-bed, or fixed bed, reactor may comprise a packed bed of solid catalyst particles through which there is a flow of gaseous and liquid reactants. In a packed-bed reactor catalyst particles are relatively large and can have different shapes and sizes. For example, in a fixed bed reactor beads, spheres, saddles or the like can be used. Also extrudates, for example with a trilobe shape, can be used in a packed bed reactor. Other possibilities are catalysts applied to a support, e.g. catalysts coated on shavings or pieces of bent wire or bent tape. The catalysts can also be in the form of fixed structures (or arranged packings) such as gauzes, corrugated sheet material which may or may not be perforated with holes, woven or non-woven structures, honeycombs and foams. Some types of packed beds may be referred to as fixed bed, multi-tubular fixed bed, immobilised slurry, trickle flow fixed bed, down-flow trickle flow packed bed, liquid up-flow packed bed, up-flow liquid full fixed bed, etc.

One preferred Fischer-Tropsch catalyst comprises cobalt as its active component. Iron may also be added, although this adds to the cost and complexity of catalyst preparation. Moreover the concentration of the iron in the catalyst can be difficult to control.

One object of the present invention is to reduce the complexity and cost of preparing iron-containing cobalt catalysts and to increase the control of the iron concentration in such catalysts.

SUMMARY OF THE INVENTION

According to a first aspect of the present invention, there is provided a process for the preparation of a packed bed comprising an iron enriched cobalt catalyst for use in a Fischer-Tropsch reaction, the process comprising the steps of:
  (a) providing a packed bed with one or more catalyst particles comprising metallic cobalt;
  (b) contacting a part of the catalyst particle(s) in the packed bed with an iron containing compound.

BRIEF DESCRIPTION OF THE DRAWINGS

FIG. 1 is a graph showing the concentration profile of iron in catalyst particles according to an embodiment of the invention.

DETAILED DESCRIPTION OF THE INVENTION

Thus the inventors of the present invention have found that by adding iron to the cobalt catalyst after reduction, the process for adding the iron is significantly simplified compared to known methods where iron is added before the catalyst precursor is reduced to metallic cobalt.

Additionally embodiments of the invention exhibit an improved $C_{5+}$ selectivity and low $CO_2$ production compared to similar catalysts which do not include iron added to metallic cobalt over a part of the catalyst particle(s) in a packed bed.

A packed bed with one or more catalyst particles comprising metallic cobalt may for example be prepared by:
  preparing one or more catalyst particles or precursors therefor comprising a cobalt compound, for example $Co_3O_4$;
  forming a fixed bed with the catalyst particle(s) or precursor(s) therefor, for example by placing the particle(s) in a (reactor) tube;
  reducing the cobalt compound to form metallic cobalt.

Alternatively, a packed bed with one or more catalyst particles comprising metallic cobalt may for example be prepared by:
  preparing one or more catalyst particles or precursors therefor comprising a cobalt compound, for example $Co_3O_4$;
  reducing the cobalt compound to form metallic cobalt;
  forming a fixed bed with the catalyst particle(s), for example by placing the particle(s) in a (reactor) tube;

The reduction may be performed in a preparation vessel adjacent to a Fischer-Tropsch reactor.

In a preferred embodiment, the reduction is conducted in situ that is in the Fischer-Tropsch reactor.

In a process according to the invention, the contacting a part of the catalyst particle(s) in the packed bed with an iron containing compound preferably is performed in situ.

Preferably the part of the catalyst particle(s) which is contacted with an iron containing compound is located at the upstream end of the packed bed. Upstream and downstream are defined herein with respect to the flow of the syngas, i.e.

the flow of the mixture of hydrogen and carbon monoxide, in a Fischer Tropsch reactor. Reference herein to the upstream end of the packed catalyst bed is thus to the end of the catalyst bed to which the syngas is supplied during Fischer Tropsch reaction. Reference herein to the downstream end of the catalyst bed is to the other end of the catalyst bed. In one embodiment, $C_{5+}$ hydrocarbons may be withdrawn from the downstream end during or after Fischer Tropsch reaction.

In a preferred embodiment 10 to 50% by weight, preferably 10 to 30%, of the catalyst particle(s), calculated on the total weight of catalyst particle(s) in the packed bed, is contacted with an iron containing compound.

In a preferred embodiment, the length of the part of the catalyst bed which is contacted with an iron containing compound is 10% to 50%, preferably 10% to 30%, of the total length of the catalyst bed.

In a preferred embodiment, after step (b) the part of the catalyst particle(s) contacted with the iron containing compound has 0.1-10 weight % of its metal as iron, more preferably 0.2-6 weight %, especially 0.3-4 weight %, calculated on the total amount of metal present in the catalyst material of this part of the catalyst particle(s).

The term "catalyst material" as used herein typically refers to an active phase material, or a precursor thereof, with an inert carrier, such as a refractory oxide, present typically as nano-sized particles. The active phase material or precursor thereof may be a catalytically active metal or precursor thereof. The catalyst material may be supported on a substrate.

The catalyst particle(s) or precursor(s) therefor may, for example, be extrudates, pellets, or one or more particles comprising catalyst material on a support. Substrates for supporting a catalyst material can be one or more of a number of materials, which are known in the art. These include metals such as steel, preferably stainless steel. Others include ceramics and combinations thereof.

In a preferred embodiment, after step (b) the part of the catalyst particle(s) contacted with the iron containing compound has iron concentrated on the outer surface.

In a preferred embodiment, after step (b) the part of the catalyst particle(s) contacted with the iron containing compound comprises 0.1 to 40 weight %, preferably 0.1 to 20 weight %, of iron in a surface layer with a depth of 100 micrometer, calculated on the total weight of said surface layer.

In a preferred embodiment, after step (b) the part of the catalyst particle(s) contacted with the iron containing compound has at least 80% of the iron within 150 μm of the outside of each catalyst particle.

The catalyst material of the catalyst particle(s) in the packed bed comprises cobalt and optionally other metals. After step (b), the part of the catalyst particle(s) contacted with the iron containing compound preferably comprises 0.1-10 weight %, more preferably 0.2-6 weight %, especially 0.3-4 weight % of iron, calculated on the total weight of metal in the catalyst material.

Preferably, a packed bed prepared according to the invention comprised an iron enriched upstream part and a non-iron enriched downstream part. The iron enriched part of the packed bed will usually show a gradient in the amount of iron present. It will be appreciated that there may be an interface between the iron enriched upstream part and the non-iron enriched downstream part in which some iron enrichment has taken place.

When the length of the part of the catalyst bed which is contacted with an iron containing compound is 10% to 50%, preferably 10% to 30%, of the total length of the catalyst bed, this part of the packed bed preferably comprises after step (b):
 0.1 to 40 weight % of iron in a surface layer with a depth of 100 micrometer, calculated on the total weight of said surface layer, and/or
 at least 80% of the iron within 150 μm of the outside of each catalyst particle, and/or
 0.1-10 weight %, more preferably 0.2-6 weight %, especially 0.3-4 weight % of iron, calculated on the total weight of metal in the catalyst material.

When 10 to 50% by weight of the catalyst particle(s), calculated on the total weight of catalyst particle(s) in the packed bed, is contacted with an iron containing compound, this part of the packed bed preferably comprises after step (b):
 0.1 to 40 weight % of iron in a surface layer with a depth of 100 micrometer, calculated on the total weight of said surface layer, and/or
 at least 80% of the iron within 150 μm of the outside of each catalyst particle, and/or
 0.1-10 weight %, more preferably 0.2-6 weight %, especially 0.3-4 weight % of iron, calculated on the total weight of metal in the catalyst material.

Preferably the packed bed is contacted with an iron containing compound at a temperature of 180 to 300° C., preferably 180 to 250° C., preferably in the presence of hydrogen and carbon monoxide. In a preferred embodiment of the present invention, the iron containing compound is an iron carbonyl compound or a mixture of iron carbonyl compounds, for example $Fe(CO)_5$.

Iron carbonyl compounds may be prepared by reacting iron oxide ($Fe_2O_3$) and/or iron (Fe) with carbon monoxide at a temperature of 80 to 150° C., preferably 80 to 100° C. The resulting iron carbonyl compounds may be transported as gas to the catalyst bed. When the catalyst bed is contacted with the iron carbonyl compounds at a temperature of 180 to 300° C., preferably 180 to 250° C., metallic iron will deposit on the catalyst bed.

In a preferred embodiment, step (b) is performed in a Fischer-Tropsch reactor prior to, or during, the reaction of synthesis gas to form hydrocarbons. When performed during Fischer Tropsch reaction, the source of iron is taken away after sufficient iron enrichment has been achieved.

The iron may be added by passing reducing gas, such as synthesis gas, over an absorption bed containing iron or an iron compound, upstream of the metallic cobalt. The absorption bed may comprise iron oxide ($Fe_2O_3$).

When the catalyst has obtained its required amount of iron, the absorption bed may be removed. If more iron is needed at a later time, the iron containing absorption bed can be used again for production of the iron containing compound. The iron containing compound is preferably gaseous at reaction conditions.

The iron containing compound is preferably soluble in wax and may be soluble in water.

The iron containing compound may be an iron carbonyl. The metallic cobalt will typically absorb the iron compound.

Reduction of cobalt may be performed using hydrogen or carbon monoxide, or a mixture thereof, that is synthesis gas. The reduction may take place at between 150-250° C. The pressure during reduction may be from ambient pressure to 60 bar.

The precursor is typically a cobalt oxide. To prepare the catalyst precursor, cobalt hydroxide ($Co(OH)_2$) can be used as a starting material. This material is dried, calcined and then decomposed to form cobalt oxide ($Co_3O_4$). Alternatively, a soluble cobalt compound may be used, such as $Co(NO_3)$ $_2.6H_2O$. It is then impregnated onto a carrier. The cobalt is further oxidised to $Co_3O_4$ which may be used as the catalyst precursor.

The carrier is preferably in a crystalline form.

The cobalt is supported on a preferably porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania.

Preferably the cobalt catalyst has around 5-50 wt % cobalt, preferably 10-30 wt % cobalt, calculated on the total weight of catalyst material. The catalyst material may be fixed on a support, for example a metal support.

The catalyst may be provided as solid particles comprising particles of carrier material and particles of cobalt therein. The catalyst may be cylindrical in shape. Alternatively the catalyst may be some other shape such as multilobal.

The catalyst may be provided as a catalyst material fixed to a support. The catalyst material may be coated on shavings or pieces of bent wire or bent tape. The catalysts can also be in the form of fixed structures (or arranged packings) such as gauzes, corrugated sheet material which may or may not be perforated with holes, woven or non-woven structures, honeycombs and foams, which comprise a layer of catalyst material.

The reactor comprises a fixed bed or packed bed, for example a multi-tubular fixed bed or an immobilised slurry bed.

Preferably the average particle size of particles used for use in a fixed bed process is 0.1-10 mm.

Typically the iron is mainly present on or in the cobalt particles, but may be present in the carrier in typically relatively smaller amounts.

Preferably therefore the iron is concentrated on the outer surface of the catalyst particles, typically as in egg shell catalysts.

There may be a concentration gradient of iron extending from a higher concentration of iron on the outside of the particles to a lower concentration of iron towards the centre of the particles. This is due to the nature of cobalt which will absorb the iron as soon as they come into contact with each other. Therefore due to diffusion limitations, iron is less likely to proceed to the centre of the particle since it is more likely to come into contact with cobalt and be quickly absorbed.

The amount of iron and its concentration at the outer surface can be controlled by adjusting the concentration of the iron containing compound, temperature, contact time and length of the catalyst bed which is exposed to the iron containing compound.

Moreover, in multitubular fixed bed reactors where the catalyst particles are provided in tubes, the concentration of iron in the catalyst particles at the top of the tubes may be higher than those in the bottom. Therefore there may in fact be a second concentration gradient in the reactor with the most iron-concentrated catalyst particles at the top of the reactor tubes and the iron-concentration of the particles gradually reducing further down the reactor tubes.

This provides a further benefit of increasing $C_{5+}$ selectivity since there is typically more hydrogen at the top of the reactor tubes.

Thus the in situ preparation of an iron based catalyst according to the invention, which, in this embodiment, uses a multitubular fixed bed reactor, results in such an iron distribution which increases $C_{5+}$ selectivity.

For particles used in a fluidised bed reactor, tubes are not used and so no iron-concentration gradient exists over the vertical length of the reactor.

Typically the concentration of cobalt throughout the catalyst particles is constant—there is typically no concentration of cobalt towards the edge of the particles. Thus the distribution of cobalt within the particles is typically homogeneous. This is especially the case for extrudated and for pelletised particles.

Thus preferred embodiments have a homogeneous distribution of cobalt throughout the particle and a concentration gradient of iron increasing towards the edge of the particle.

When the catalyst is provided as a catalyst material fixed to a support, the concentration of cobalt throughout the catalyst material on the support is constant. Thus the distribution of cobalt within the catalyst material layer on the substrate is typically homogeneous.

The embodiments of the present invention benefit because the Fischer-Tropsch reaction can function with a $H_2$:CO ratio of 2.00:1 because there are no diffusion limitations. This increases $C_{5+}$ selectivity.

The $H_2$/CO ratio for a known fluidised bed reactor is normally 1.8:1-2.0:1. Thus a benefit of certain embodiments of the present invention is that the hydrogen and carbon monoxide ratios can be closer to the stoichiometric 2:1 which would, in certain known systems, produce too much unwanted methane.

A benefit of certain embodiments of the present invention is that an optimum concentration of iron in a cobalt catalyst can be provided.

One preferred catalyst also comprises manganese or vanadium as a promoter.

According to a second aspect of the invention, there is provided a catalyst manufactured by a process as described herein.

The Fischer-Tropsch catalyst typically comprises catalyst particles preferably with at least 80% of the iron within 200 µm, preferably 150 µm of the outside of each catalyst particle.

Preferably the catalyst particles have a concentration gradient of iron extending from a higher concentration of iron on the outside of the particles to a lower concentration of iron towards the centre of the particles.

The cobalt and the promoter, if present, may be formed with the carrier material by any suitable treatment, such as dispersing or co-milling. Alternatively, impregnation, kneading and extrusion may be used. After deposition of the cobalt and, if appropriate, the promoter on the carrier material, the loaded carrier is typically subjected to drying and/or to calcination at a temperature of generally from 350 to 750° C., preferably a temperature in the range of from 450 to 600° C. The effect of the calcination treatment is to remove chemically or physically bonded water such as crystal water, to decompose volatile decomposition products and to convert organic and inorganic compounds to their respective oxides.

In certain embodiments, the amount of cobalt present in the catalyst may range from 1 to 100 parts by weight per 100 parts by weight of carrier material, preferably from 3 to 50 parts by weight per 100 parts by weight of carrier material.

The cobalt and iron may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB, VIIB and/or VIII of the Periodic Table, in particular titanium, zirconium, manganese and/or vanadium, especially manganese or vanadium. As an alternative or in addition to the metal oxide promoter, the catalyst may comprise a metal promoter selected from Groups VIIB and/or VIII of the Periodic Table. Preferred metal promoters include rhenium, manganese, ruthenium, platinum and palladium.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

The Fischer-Tropsch process is well known to those skilled in the art and involves synthesis of hydrocarbons from syngas, by contacting the syngas at reaction conditions with a Fischer-Tropsch catalyst.

Thus according to a further aspect of the invention, there is provided a process for the production of liquid hydrocarbons, the process comprising catalytically converting carbon monoxide and hydrogen at elevated temperatures and pressures, into liquid hydrocarbons, and optionally solid hydrocarbons and optionally liquefied petroleum gas; wherein the catalyst used is a catalyst as described herein.

The carbon monoxide and hydrogen (i.e. synthesis gas) can be provided by any suitable means, process or arrangement. This includes partial oxidation and/or reforming of a hydrocarbonaceous feedstock as is known in the art.

Typically the synthesis gas is produced by partial oxidation of a hydrocarbonaceous feed. The hydrocarbonaceous feed suitably is methane, natural gas, associated gas or a mixture of $C_{1-4}$ hydrocarbons. The feed comprises mainly, i.e. more than 90 v/v %, especially more than 94%, $C_{1-4}$ hydrocarbons, especially comprises at least 60 v/v percent methane, preferably at least 75 percent, more preferably 90 percent. Very suitably natural gas or associated gas is used. Suitably, any sulphur in the feedstock is removed.

The partial oxidation of gaseous feedstocks, producing mixtures of especially carbon monoxide and hydrogen, can take place according to various established processes. These processes include the Shell Gasification Process. A comprehensive survey of this process can be found in the Oil and Gas Journal, Sep. 6, 1971, pp 86-90.

The oxygen containing gas for the partial oxidation typically contains at least 95 vol. %, usually at least 98 vol. %, oxygen. Oxygen or oxygen enriched air may be produced via cryogenic techniques, but could also be produced by a membrane based process, e.g. the process as described in WO 93/06041.

To adjust the $H_2/CO$ ratio in the syngas, carbon dioxide and/or steam may be introduced into the partial oxidation process. Preferably up to 15% volume based on the amount of syngas, preferably up to 8% volume, more preferable up to 4% volume, of either carbon dioxide or steam is added to the feed. Water produced in the hydrocarbon synthesis may be used to generate the steam. As a suitable carbon dioxide source, carbon dioxide from the effluent gasses of the expanding/combustion step may be used. The $H_2/CO$ ratio of the syngas is suitably between 1.5 and 2.3, preferably between around 2.0. If desired, (small) additional amounts of hydrogen may be made by steam methane reforming, preferably in combination with the water gas shift reaction. Any carbon monoxide and carbon dioxide produced together with the hydrogen may be used in the gasification and/or hydrocarbon synthesis reaction or recycled to increase the carbon efficiency. Hydrogen from other sources, for example hydrogen itself, may be an option.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

The Fischer-Tropsch tail gas may be added to the partial oxidation process.

Products of the Fischer-Tropsch synthesis may range from methane to heavy paraffin waxes. Preferably, the production of methane is minimised and a substantial portion of the hydrocarbons produced have a carbon chain length of at least 5 carbon atoms. Preferably, the amount of $C_{5+}$ hydrocarbons is at least 60% by weight of the total product, more preferably, at least 70% by weight, even more preferably, at least 80% by weight, most preferably at least 85% by weight.

The hydrocarbons produced in the process are suitably $C_{3-200}$ hydrocarbons, more suitably $C_{4-150}$ hydrocarbons, especially $C_{5-100}$ hydrocarbons, or mixtures thereof. These hydrocarbons or mixtures thereof are liquid or solid at temperatures between 5 and 30° C. (1 bar), especially at about 20° C. (1 bar), and usually are paraffinic of nature, while up to 30 wt %, preferably up to 15 wt %, of either olefins or oxygenated compounds may be present.

Depending on the process conditions used in a Fischer-Tropsch reaction, various proportions of normally gaseous hydrocarbons, normally liquid hydrocarbons and optionally normally solid hydrocarbons are obtained. It is often preferred to obtain a large fraction of normally solid hydrocarbons. These solid hydrocarbons may be obtained up to 90 wt % based on total hydrocarbons, usually between 50 and 80 wt %.

A part may boil above the boiling point range of the so-called middle distillates. The term "middle distillates", as used herein, is a reference to hydrocarbon mixtures of which the boiling point range corresponds substantially to that of kerosene and gasoil fractions obtained in a conventional atmospheric distillation of crude mineral oil. The boiling point range of middle distillates generally lies within the range of about 150 to about 360° C.

The higher boiling range paraffinic hydrocarbons, if present, may be isolated and subjected to a catalytic hydrocracking step, which is known per se in the art, to yield the desired middle distillates. The catalytic hydro-cracking is carried out by contacting the paraffinic hydrocarbons at elevated temperature and pressure and in the presence of hydrogen with a catalyst containing one or more metals having hydrogenation activity, and supported on a support comprising an acidic function. Suitable hydrocracking catalysts include catalysts comprising metals selected from Groups VIB and VIII of the (same) Periodic Table of Elements. Preferably, the hydrocracking catalysts contain one or more noble metals from Group VIII. Preferred noble metals are platinum, palladium, rhodium, ruthenium, iridium and osmium. Most preferred catalysts for use in the hydro-cracking stage are those comprising platinum.

Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may be transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired.

Thus the invention also provides hydrocarbon products synthesised by a Fischer-Tropsch reaction and catalysed by a catalyst as described herein.

The hydrocarbon product may have undergone the steps of hydroprocessing, preferably hydrogenation, hydroisomerisation and/or hydrocracking.

The hydrocarbon product may be a fuel, preferably naphtha, kerosene or gasoil, a waxy raffinate or a base oil.

Any percentage mentioned in this description is calculated on total weight or volume of the composition, unless indicated differently. When not mentioned, percentages are considered to be weight percentages. Pressures are indicated in bar absolute, unless indicated differently.

EXAMPLES

An embodiment of the present invention will now be described, by way of example only, with reference to FIG. 1 which is a graph showing the concentration profile of iron in catalyst particles in accordance with the present invention.

Cobalt catalyst or catalyst precursor particles were prepared using an extrusion process. After calcination these particles were placed in a Fisher Tropsch reactor. A catalyst was prepared according to the present invention by in situ reduction of the cobalt catalyst in a fixed bed in a multitubular Fischer-Tropsch reactor.

After the reduction, an absorption bed comprising iron oxide was provided in the gas feed stream upstream of the Fischer-Tropsch reactor. The iron source was thus directed to the reduced Fischer-Tropsch catalyst in the reactor. Iron is absorbed by the catalyst, preferentially absorbed towards its outer surface.

FIG. 1 shows the concentration profile of iron in typical catalyst particles. As can be seen, the concentration of iron is greater towards the edge of the catalyst particles. Although not shown from the figure, the concentration profile of the cobalt is generally consistent throughout the particle, although local variances may be present.

Table 1 below shows XRF analysis on three different catalyst particles in accordance with the present invention from the top, middle and bottom of a reactor tube in the multitubular Fischer-Tropsch reactor.

TABLE 1

| Particle | Fe concentration at middle of particle (wt %) | Fe concentration at edge of particle (wt %) |
|---|---|---|
| Particle from top 1 m of reactor tube | 0.08 | 1.76 |
| Particle from middle of reactor tube | 0.03 | 0.26 |
| Particle from bottom 1 m of reactor tube | 0.00 | 0.08 |

These results support the results shown in FIG. 1, that the concentration of iron is higher towards the edge of the particle compared with the centre of the particle. The results also show that the concentration of the iron in the multitubular reactor is gradually less for particles lower down in the reactor tubes of a multitubular reactor.

The selectivity of a cobalt/titania catalyst with iron was compared to the selectivity of a cobalt/titania catalyst without iron. Each catalyst had 20 wt % cobalt whereas only the first catalyst had 0.2-0.3 wt % iron prepared in accordance with the present invention; whereby the weight percentages were calculated on the total weight of the catalyst. The first catalyst exhibited a $C_{5+}$ selectivity of 95% at 202° C. compared to 93.5% at 198° C. for the second catalyst (without iron). This is especially surprising because selectivity is expected to decrease at higher temperatures.

Thus embodiments of the invention improve selectivity of $C_{5+}$ hydrocarbons compared to known Fischer-Tropsch catalysts.

Improvements and modifications may be made without departing from the scope of the invention.

What is claimed is:

1. A process for the preparation of a packed bed comprising an iron enriched cobalt catalyst for use in a Fischer-Tropsch reaction, the process comprising the steps of:
   (a) providing a packed bed with one or more catalyst particles comprising metallic cobalt;
   (b) contacting a part of the catalyst particle(s) in the packed bed with an iron containing compound;
   wherein the part of the catalyst particle(s) which is contacted with an iron containing compound is located at the upstream end of the packed bed, and wherein 10 to 50% by weight of the catalyst particle(s), calculated on the total weight of catalyst particle(s) in the packed bed, are contacted with an iron containing compound, and wherein the iron containing compound is an iron carbonyl compound or a mixture of iron carbonyl compounds.

2. A process according to claim 1, wherein the catalyst particle(s) are contacted with an iron containing compound at a temperature of 180 to 300° C.

3. A process according to claim 1, wherein after step (b) the part of the catalyst particle(s) contacted with the iron containing compound has iron concentrated on the outer surface.

4. A process according to claim 1, wherein after step (b) the part of the catalyst particle(s) contacted with the iron containing compound comprises 0.1 to 40 weight % of iron in a surface layer with a depth of 100 micrometers, calculated on the total weight of said surface layer.

5. A process as claimed in claim 1, wherein after step (b) the part of the catalyst particle(s) contacted with the iron containing compound has at least 80% of the iron within 150 µm of the outside of each catalyst particle.

6. A process according to claim 1, wherein after step
   (b) the part of the catalyst particle(s) contacted with the iron containing compound has 0.1-10 weight % of its metal as iron, calculated on the total weight of metal present in the catalyst material of this part of the catalyst particle(s).

7. A process according to claim 1, wherein step (b) is performed in a Fischer-Tropsch reactor prior to, or during, the reaction of synthesis gas to form hydrocarbons.

8. A process according to claim 1, wherein the iron is added by passing gas over an absorption bed containing iron carbonyl, upstream of the packed bed with one or more catalyst particles comprising metallic cobalt.

* * * * *